(12) United States Patent
Kluss

(10) Patent No.: US 9,996,328 B1
(45) Date of Patent: Jun. 12, 2018

(54) COMPILING AND OPTIMIZING A COMPUTER CODE BY MINIMIZING A NUMBER OF STATES IN A FINITE MACHINE CORRESPONDING TO THE COMPUTER CODE

(71) Applicant: Archeo Futurus, Inc., Palo Alto, CA (US)

(72) Inventor: Daniel Joseph Bentley Kluss, Las Vegas, NV (US)

(73) Assignee: Archeo Futurus, Inc., Palo Alto, CA (US)

( * ) Notice: Subject to any disclaimer, the term of this patent is extended or adjusted under 35 U.S.C. 154(b) by 0 days. days.

(21) Appl. No.: 15/630,691

(22) Filed: Jun. 22, 2017

(51) Int. Cl.
*G06F 17/50* (2006.01)
*G06F 9/45* (2006.01)
(Continued)

(52) U.S. Cl.
CPC .............. *G06F 8/51* (2013.01); *G06F 8/427* (2013.01); *G06F 8/443* (2013.01);
(Continued)

(58) Field of Classification Search
CPC ............ G06F 17/5022; G06F 17/5045; G06F 17/2775; G06F 17/30985; G06F 17/273; G06F 17/2264; G06F 17/30958; G06F 8/4434; G06F 8/433; G06F 8/427; G06F 9/444; G06F 9/5027; G06F 21/552; G06F 17/30684; G06F 17/2755; G06F 17/2818;
(Continued)

(56) References Cited

U.S. PATENT DOCUMENTS 5,477,451 A * 12/1995 Brown ................ G06F 17/2755
704/2
5,510,981 A * 4/1996 Berger ................ G06F 17/2818
704/2
(Continued)

OTHER PUBLICATIONS

Johan Jeuring et al., Grammar and Parsing, 2001, [Retrieved on Jan. 31, 2018]. Retrieved from the internet: <URL: http://www.cs.uu.nl/docs/vakken/gont/diktaat.pdf> 275 Pages (1-267) (Year: 2001).*
(Continued)

*Primary Examiner* — Anibal Rivera
(74) *Attorney, Agent, or Firm* — Carr & Ferrell LLP (57) ABSTRACT

Methods and systems for compiling codes from programming languages into programming languages are disclosed. An example method may include acquiring a first code written in a first language. The method allows generating, based on the first code, a first deterministic finite state machine (DFSM). The method includes optimizing the first DFSM to obtain a second DFSM. The method includes generating, based on the second DFSM, a second code. The second code can be written in a second language. Generating the first DFSM includes parsing the first code into a first abstract syntax tree (AST), translating the first AST into a first non-deterministic finite state machine (NFSM), and converting the first NFSM into the first DFSM. Generating the second code includes translating the second DFSM into a second NFSM, translating the second NFSM into a second AST, and recompiling the second AST into a second code.

9 Claims, 4 Drawing Sheets

(51) Int. Cl.
*G06F 9/44* (2018.01)
*G06F 17/30* (2006.01)
*G06F 21/57* (2013.01)
*G06F 17/22* (2006.01)
*G06F 21/55* (2013.01)

(52) U.S. Cl.
CPC ........ *G06F 17/2247* (2013.01); *G06F 21/577* (2013.01); *G06F 8/31* (2013.01); *G06F 8/76* (2013.01); *G06F 9/444* (2013.01); *G06F 17/5022* (2013.01); *G06F 21/552* (2013.01); *G06F 2221/034* (2013.01)

(58) Field of Classification Search
CPC ...... G06F 17/505; G06F 17/504; G06F 8/443; G06F 8/4442; G06F 8/31; G06F 8/423; G06F 8/30; G06F 8/447; G06F 8/45; G06F 9/4552; G06F 11/3608; G06F 8/51; G06F 9/38; G06F 21/563; G06F 7/271; G06F 17/2247; G06F 17/30982; H04L 63/0245; H04L 63/1408; H04L 63/0254; H04L 63/1416; G06K 9/00986; G06K 9/00973
See application file for complete search history.

(56) References Cited

U.S. PATENT DOCUMENTS

| | | | | |
|---|---|---|---|---|
| 5,606,690 A * | 2/1997 | Hunter | G06F 17/273 | 382/229 |
| 5,960,200 A * | 9/1999 | Eager | G06F 8/427 | 703/13 |
| 5,978,801 A * | 11/1999 | Yuasa | G06F 17/30985 | |
| 6,018,735 A * | 1/2000 | Hunter | G06F 17/30985 | |
| 6,223,189 B1 * | 4/2001 | Steffens | G06F 17/2264 | 715/209 |
| 6,308,149 B1 * | 10/2001 | Gaussier | G06F 17/2755 | 704/9 |
| 7,136,947 B1 * | 11/2006 | Passerone | G06F 17/5045 | 710/100 |
| 7,185,081 B1 * | 2/2007 | Liao | H04L 47/2441 | 709/224 |
| 7,188,168 B1 * | 3/2007 | Liao | H04L 43/18 | 709/224 |
| 7,398,197 B1 * | 7/2008 | Mohri | G10L 15/193 | 704/1 |
| 7,503,027 B1 * | 3/2009 | Zhao | G01R 31/31726 | 716/104 |
| 7,991,723 B1 * | 8/2011 | Dubrovsky | G06F 21/552 | 706/45 |
| 8,024,691 B2 * | 9/2011 | Zilic | G06F 17/504 | 703/14 |
| 8,806,456 B2 * | 8/2014 | Gazzillo | G06F 8/423 | 717/142 |
| 9,177,253 B2 * | 11/2015 | Ruehle | G06N 5/025 | |
| 9,262,555 B2 * | 2/2016 | Coalson | G06F 17/30985 | |
| 9,426,166 B2 * | 8/2016 | Billa | H04L 63/1408 | |
| 9,448,965 B2 * | 9/2016 | Brown | G06F 9/444 | |
| 2003/0018461 A1 * | 1/2003 | Beer | G06F 17/504 | 703/14 |
| 2003/0221013 A1 * | 11/2003 | Lockwood | H04L 41/08 | 709/231 |
| 2004/0019883 A1 * | 1/2004 | Banerjee | G06F 8/4434 | 717/152 |
| 2004/0103408 A1 * | 5/2004 | Chilimbi | G06F 8/4442 | 717/140 |
| 2004/0172234 A1 * | 9/2004 | Dapp | G06F 8/427 | 704/1 |
| 2004/0215593 A1 * | 10/2004 | Sharangpani | G06F 17/30982 | |
| 2004/0225999 A1 * | 11/2004 | Nuss | G06F 8/31 | 717/114 |
| 2005/0177736 A1 * | 8/2005 | de los Santos | G06F 21/563 | 713/188 |
| 2006/0117307 A1 * | 6/2006 | Averbuch | G06F 17/2247 | 717/143 |
| 2006/0235811 A1 * | 10/2006 | Fairweather | G06F 8/427 | 706/12 |
| 2007/0130140 A1 * | 6/2007 | Cytron | G06F 17/30985 | |
| 2007/0226362 A1 * | 9/2007 | Johnson | H04L 43/18 | 709/230 |
| 2008/0071802 A1 * | 3/2008 | Lucco | G06F 17/2247 | |
| 2008/0082946 A1 * | 4/2008 | Zilic | G06F 17/504 | 716/103 |
| 2008/0140662 A1 * | 6/2008 | Pandya | G06F 9/444 | |
| 2009/0083265 A1 * | 3/2009 | Michailov | G06F 17/30985 | |
| 2010/0094906 A1 * | 4/2010 | Della-Libera | G06F 9/444 | 707/797 |
| 2010/0138367 A1 * | 6/2010 | Yamagaki | G06F 17/30985 | 706/12 |
| 2010/0281160 A1 * | 11/2010 | Ros-Giralt | H04L 43/18 | 709/224 |
| 2011/0022617 A1 * | 1/2011 | Yamagaki | G06F 7/02 | 707/758 |
| 2011/0307503 A1 * | 12/2011 | Dlugosch | G06K 9/00973 | 707/758 |
| 2012/0072380 A1 * | 3/2012 | Liu | H04L 45/7457 | 706/12 |
| 2012/0191446 A1 * | 7/2012 | Binsztok | G06F 8/30 | 704/9 |
| 2012/0192163 A1 * | 7/2012 | Glendenning | G06F 17/5045 | 717/143 |
| 2012/0192164 A1 * | 7/2012 | Xu | G06F 8/447 | 717/149 |
| 2012/0192165 A1 * | 7/2012 | Xu | G06F 8/45 | 717/149 |
| 2012/0192166 A1 * | 7/2012 | Xu | G06F 17/505 | 717/149 |
| 2012/0221497 A1 * | 8/2012 | Goyal | H04L 63/1416 | 706/12 |
| 2013/0007530 A1 * | 1/2013 | Atasu | G06F 11/3608 | 714/40 |
| 2013/0133064 A1 * | 5/2013 | Goyal | H04L 63/0254 | 726/22 |
| 2013/0156043 A1 * | 6/2013 | Brown | G06K 9/00973 | 370/428 |
| 2013/0159239 A1 * | 6/2013 | Brown | G06K 9/00986 | 706/48 |
| 2013/0159671 A1 * | 6/2013 | Brown | G06K 9/00986 | 712/36 |
| 2013/0174131 A1 | 7/2013 | Takeuchi | | |
| 2013/0282649 A1 * | 10/2013 | Guanella | G06N 5/00 | 706/59 |
| 2014/0025614 A1 * | 1/2014 | Noyes | G06F 15/7867 | 706/29 |
| 2014/0025905 A1 * | 1/2014 | Brown | G06N 3/02 | 711/154 |
| 2014/0067736 A1 * | 3/2014 | Noyes | G06F 1/3206 | 706/20 |
| 2014/0068167 A1 * | 3/2014 | Brown | G05B 19/045 | 711/105 |
| 2014/0068234 A1 * | 3/2014 | Brown | G05B 19/045 | 712/227 |
| 2014/0089249 A1 | 3/2014 | Dubrovsky et al. | | |
| 2014/0244554 A1 * | 8/2014 | Atasu | G06F 9/38 | 706/12 |
| 2014/0279776 A1 * | 9/2014 | Brown | G06F 9/444 | 706/20 |
| 2014/0280358 A1 * | 9/2014 | Coalson | G06F 17/30958 | 707/798 |
| 2014/0282393 A1 * | 9/2014 | Coalson | G06F 8/31 | 717/117 |
| 2015/0039550 A1 * | 2/2015 | Cheetancheri et al. | G06F 9/444 | 706/48 |
| 2015/0067200 A1 * | 3/2015 | Goyal | H04L 41/28 | 710/24 |
| 2015/0067776 A1 * | 3/2015 | Billa | H04L 63/0245 | 726/3 |
| 2015/0082207 A1 * | 3/2015 | Prasad | G06F 3/048 | 715/762 |

(56) References Cited

U.S. PATENT DOCUMENTS

| | | | |
|---|---|---|---|
| 2015/0121337 A1* | 4/2015 | Makarov | G06F 9/444 717/115 |
| 2015/0135171 A1 | 5/2015 | Ishii et al. | |
| 2015/0242194 A1* | 8/2015 | Vargas | G06F 8/51 717/137 |
| 2015/0277865 A1 | 10/2015 | Gorissen et al. | |
| 2015/0277915 A1* | 10/2015 | Kelm | G06F 9/4552 712/226 |
| 2015/0293846 A1* | 10/2015 | Goyal | H04L 63/0227 711/122 |
| 2015/0293910 A1* | 10/2015 | Mathur | G06F 17/30684 704/2 |
| 2015/0295889 A1* | 10/2015 | Goyal | G06N 5/047 726/11 |
| 2016/0012033 A1* | 1/2016 | Craymer, III | G06F 17/271 704/9 |
| 2016/0259874 A1* | 9/2016 | Andrade | G06F 17/5022 |
| 2017/0097852 A1* | 4/2017 | Glendenning | G06F 9/5027 |
| 2017/0131983 A1* | 5/2017 | Roytman | G06F 8/443 |

OTHER PUBLICATIONS

Sergio Medeiros et al., From Regexes to Parsing Expression Grammars, Oct. 17, 2012, [Retrieved on Jan. 31, 2018]. Retrieved from the internet: <URL: https://arxiv.org/pdf/1210.4992.pdf> 34 Pages (1-34) (Year: 2012).*

Franklin L. DeRemer, Generating parsers from BNF grammars, May 14-16, 1969, [Retrieved on Jan. 31, 2018]. Retrieved from the internet: <URL: https://dl.acm.org/citation.cfm?id=1476928> 8 Pages (793-798) (Year: 1969).*

"International Search Report" and "Written Opinion of the International Searching Authority," Patent Cooperation Treaty Application No. PCT/US2017/038825, dated Sep. 1, 2017, 8 pages.

Barrett, William A., "Compiler Design," Fall 2005, Dec. 21, 2005, Retrieved from the Internet: <http://citseerx.ist.psu.edu/viewdoc/download?doi=10.1.1.462.9894&rep=rep1&type=pdf>, pp. 39, 592.

* cited by examiner

COMPILING AND OPTIMIZING A COMPUTER CODE BY MINIMIZING A NUMBER OF STATES IN A FINITE MACHINE CORRESPONDING TO THE COMPUTER CODE

TECHNICAL FIELD

This disclosure relates generally to data processing and, more specifically, to methods and systems for compiling and optimizing a computer code by minimizing a number of states in a finite machine corresponding to the computer code.

BACKGROUND

The approaches described in this section could be pursued but are not necessarily approaches that have been previously conceived or pursued. Therefore, unless otherwise indicated, it should not be assumed that any of the approaches described in this section qualify as prior art merely by virtue of their inclusion in this section.

A computer can be defined as a device configured to automatically perform a set of logical or arithmetic operations. Such devices include mechanical and electromechanical computers, analog computers, vacuum tubes and digital electronic circuits, transistors, and integrated circuits, and the like. There has been a variety of computing platforms, ranging from portable mobile computers to supercomputer systems. This has resulted in a tremendous amount of code written for different computer platforms.

Translating code from one computing platform to another computing platform is a challenging task. One of the translation issues needing to be addressed is that code written for one computing platform may not satisfy limits of another computing platform in terms of memory, run-time, and power usage. Another issue is that the code translated from one computing platform to another computing platform may include software-related security vulnerabilities, like memory leaks, buffer overflows, and so forth.

SUMMARY

This summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter.

Embodiments disclosed herein are directed to methods and systems for compiling and optimizing a computer code by minimizing a number of states in a finite machine corresponding to the computer code. According to an example embodiment, a method includes acquiring a first code, with the first code being written in a first language. The method may include generating, based on the first code, a first deterministic finite state machine (DFSM). The method may include optimizing the first DFSM to obtain a second DFSM. The method may also include generating, based on the second DFSM, a second code, with the second code being written in a second language.

In some embodiments, generating the first DFSM includes generating, based on the first code, a non-deterministic finite state machine (NFSM) and converting the NFSM to the first DFSM. In certain embodiments, generating the NFSM includes parsing, based on a first grammar associated with the first language, the first code to obtain an abstract syntax tree (AST) and converting the AST to the NFSM.

In some embodiments, generating the second code includes converting the second DFSM to a NFSM and generating, based on the NFSM, the second code. In certain embodiments, generating the second code includes converting the NFSM to an AST and recompiling, based on a second grammar associated with the second language, the AST to the second code.

In some embodiments, optimizing the first DFSM is performed to minimize a number of states in the second DFSM. Optimizing the first DFSM includes twice reversing the first DFSM to an NFSM.

In some embodiments, the first language or the second language includes a programming language such as one of the following: JavaScript®, C, C++, Perl® C#, PHP, Python®, an assembly language, and so forth. In certain embodiments, the first language or the second language includes a presentation language (e.g., Hypertext Markup Language (HTML), Extensible Markup Language (XML), and so forth). In some embodiments, the first language or the second language includes a style sheet language, for example, Cascading Style Sheets (CSS). In some embodiments, the first language or second language includes Hardware Description Language (HDL) or bits native to a field-programmable gate array.

In some embodiments, the method may include generating the second code and performing, based on a formal specification, a formal verification of the second DFSM. In further embodiments, the first language or the second language may include a binary assembly executable by a processor.

According to another example embodiment of the present disclosure, the steps of the method for compiling and optimizing a computer code by minimizing a number of states in a finite machine corresponding to the computer code are stored on a machine-readable medium comprising instructions, which, when implemented by one or more processors, perform the recited steps.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

The technology described herein allows translating a source code from one programming language to another programming language. Some embodiments of the present disclosure may allow optimizing source code in terms of a number of states of a DFSM. Some embodiments of the present disclosure may facilitate optimizing the source code according to requirements of a hardware description. Embodiments of the present disclosure may allow reducing or eliminating a source code's security vulnerabilities, including buffer overflows, stacking overflow, memory leaks, uninitialized data, and so forth.

According to an example embodiment, the method for compiling and optimizing a computer code by minimizing a number of states in a finite machine corresponding to the computer code is disclosed. The method may include acquiring a first code is disclosed, with the first code being written in a first language. The method may include generating, based on the first code, a first DFSM. The method may also include optimizing the first DFSM to obtain a second DFSM. The method may also include generating, based on the second DFSM, a second code, the second code being written in a second language.

Figure 1:
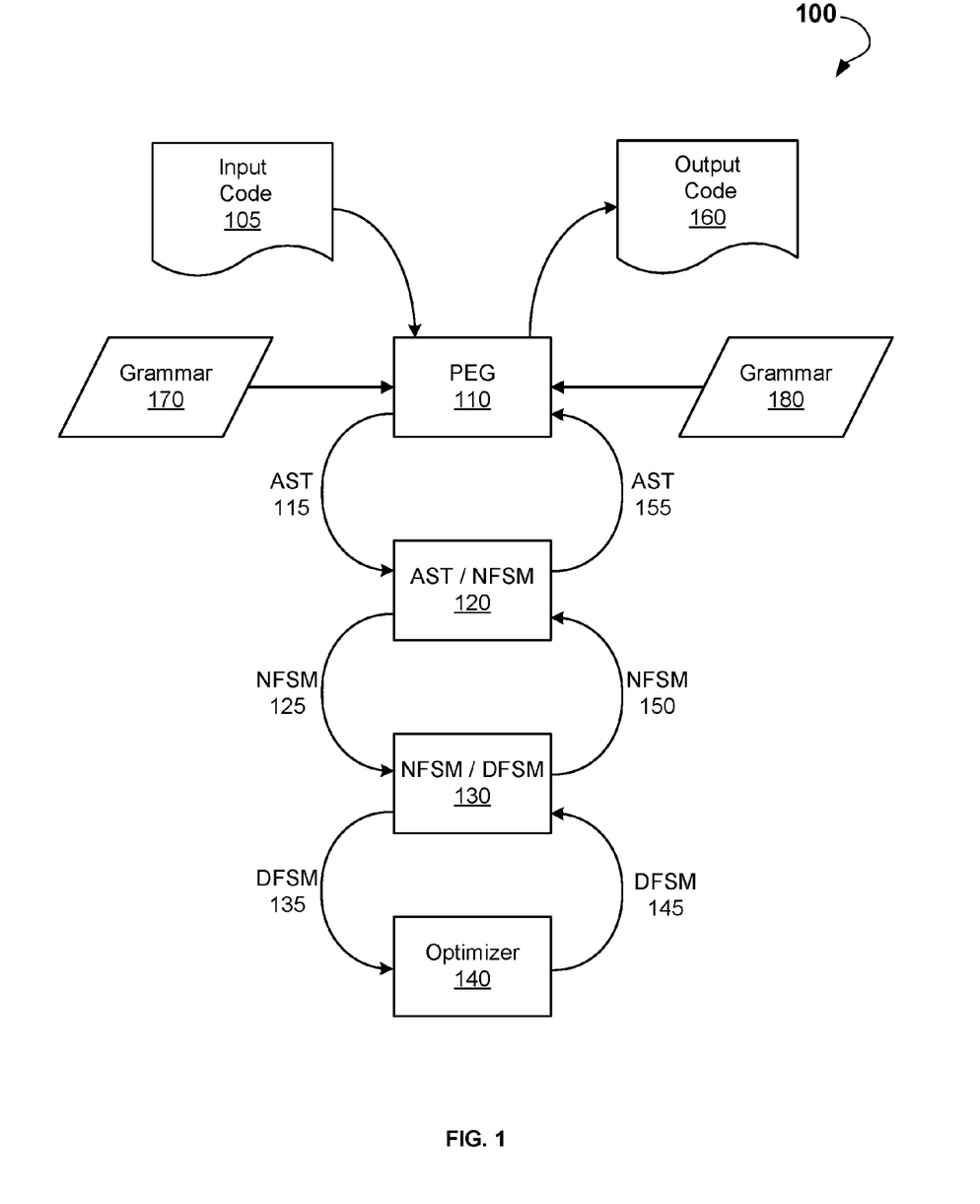
FIG. 1 is a block diagram showing a system for compiling source code, according to some example embodiments.

FIG. 1 is a block diagram showing an example system 100 for compiling source code, according to some example embodiments. The example system 100 may include a parsing expression grammar (PEG) module 110, a converter 120 between AST and NFSM, a converter 130 between NFSM and DFSM, and an optimizer 140. The system 100 can be implemented with a computer system. An example computer system is described below with reference to FIG. 4.

In some embodiments of the present disclosure, the PEG module 110 may be configured to receive an input code 105. In some embodiments, the input code 105 may be written in an input programming language. The input programming language may be associated with a grammar 170. In some embodiments, the grammar 170 may be determined by an augmented Backus-Naur Form (ABNF). The PEG module may be configured to convert the input code 105 into an AST 115 based on the grammar 170. The AST 115 may be further provided to converter 120.

In some embodiments of the disclosure, the converter 120 may be configured to transform the AST 115 into NFSM 125. Thereafter, NFSM 125 may be provided to the converter 130. The converter 130 may be configured to translate the NFSM 125 into DFSM 135. The DFSM 135 can be provided to optimizer 140.

In some embodiments, optimizer 140 may be configured to optimize the DFSM 135 to obtain a DFSM 145. In some embodiments, the optimization may include minimizing a number of states in the DFSM 135. In various embodiments, optimization can be performed by an implication chart method, Hoperoft's algorithm, Moore reduction procedure, Brzozowski's algorithm, and other techniques. Brzozowski's algorithm includes reversing the edges of a DFSM to produce a NFSM, and converting this NFSM to a DFSM using a standard powerset construction by constructing only the reachable states of the converted DFSM. Repeating the reversing a second time produces a DFSM with a provable minimum of number of states in the DFSM.

In some embodiments, the DFSM 145, which is an optimized DFSM 135, can be further provided to converter 130. The converter 130 may be configured to translate the DFSM 145 into a NFSM 150. The NFSM 150 may be further provided to converter 120. The converter 120 may be configured to translate the NFSM 150 into an AST 155. The AST 155 may be further provided to PEG module 110.

In some embodiments, the PEG module 110 may be configured to convert the AST 155 into output code 160 based on a grammar 180. The grammar 180 may specify an output programming language.

In some embodiments, the input languages or output languages may include one of high level programming languages, such as but not limited to C, C++, C#, JavaScript®, PHP, Python®, Perl® and the like. In various embodiments, the input code or output source code can be optimized to run on various hardware platforms like Advanced RISC Machine (ARM), x86-64, graphics processing unit (GPU), a field-programmable gate array (FPGA), or a custom application-specific integrated circuit (ASIC). In various embodiments, the input code or source code can be optimized to run on various operational systems and platforms, such as Linux® Windows® Mac OS® Android®, iOS®, OpenCL®/CUDA® bare metal, FPGA, and a custom ASIC.

In certain embodiments, the output programming language can be the same as the input programming languages. In these embodiments, the system 100 can be used to optimize the input code 105 by converting the input code 105 to the DFSM 135, optimizing the DFSM 135 in terms of number of states, and converting the optimized DFSM 135 to output code 160 in the original programming language.

In some other embodiments, the input programming language may include a domain specific language (DSL) which is determined by a strict grammar (i.e., ABNF). In these embodiments, the system 100 may be used to convert documents written in a DSL to an output code 160 written in a high-level programming language or a code written in a low level programming language. In certain embodiments, input code 105 or output code 160 can be written in a presentation language, including, but not limited to, HTML, XML, and XHTML. In some embodiments, input code 105 or output code 160 may include CSS.

In some embodiments, the system 100 may further include a database. The database may be configured to store frequently occurring patterns in the input code written in specific programming languages and parts of optimized DFSM corresponding to the frequently occurring patterns. In these embodiments, the system 100 may include an additional module for looking up a specific pattern of the input code 105 in the database. If the database includes an entry containing a specific pattern and corresponding parts of DFSM, then system 100 may be configured to substitute the specific pattern with the corresponding part of DFSM directly, and by skipping steps for converting the specific pattern to the AST and generating the NFSM and the DFSM.

In some embodiments, the input code or output code may include a binary assembly executable by a processor.

In some embodiments, the input code 105 or output code 160 may be written in a HDL, such as SystemC, Verilog, and Very High Speed Integrated Circuits Hardware Description Language (VHDL). The input code 105 or output code 160 may include bits native to the FPGA as programmed using Joint Test Action Group (JTAG) standards. In certain embodiments, DFSM 135 can be optimized using a constraint solver. The constraint solver may include some requirements on a hardware platform described by the HDL. For example, the requirements may include requirements for a runtime, power usage, and cost of the hardware platform. The optimization of the DFSM 135 can be carried out to satisfy one of the restrictions of the requirements. In certain embodiments, the optimization of the DFSM may be performed to satisfy several requirement restrictions with weights assigned to each of the restrictions. In some embodiments, the DFSM 135 may be formally verified in accordance with a formal specification to detect software-related security vulnerabilities, including but not limited to, memory leak, division-by-zero, out-of-bounds array access, and others.

In certain embodiments, the input source can be written in terms of a technical specification. An example technical specification can include a Request for Comments (RFC). In some embodiments, the technical specification may be associated with a specific grammar. Using the specific grammar, the input code, written in terms of the technical specification, can be translated into the AST 115 and further into the DFSM 135. In some embodiments, the DFSM 135 can be optimized using a constraint solver. The constraint solver may include restrictions described in the technical specification.

Figure 2:
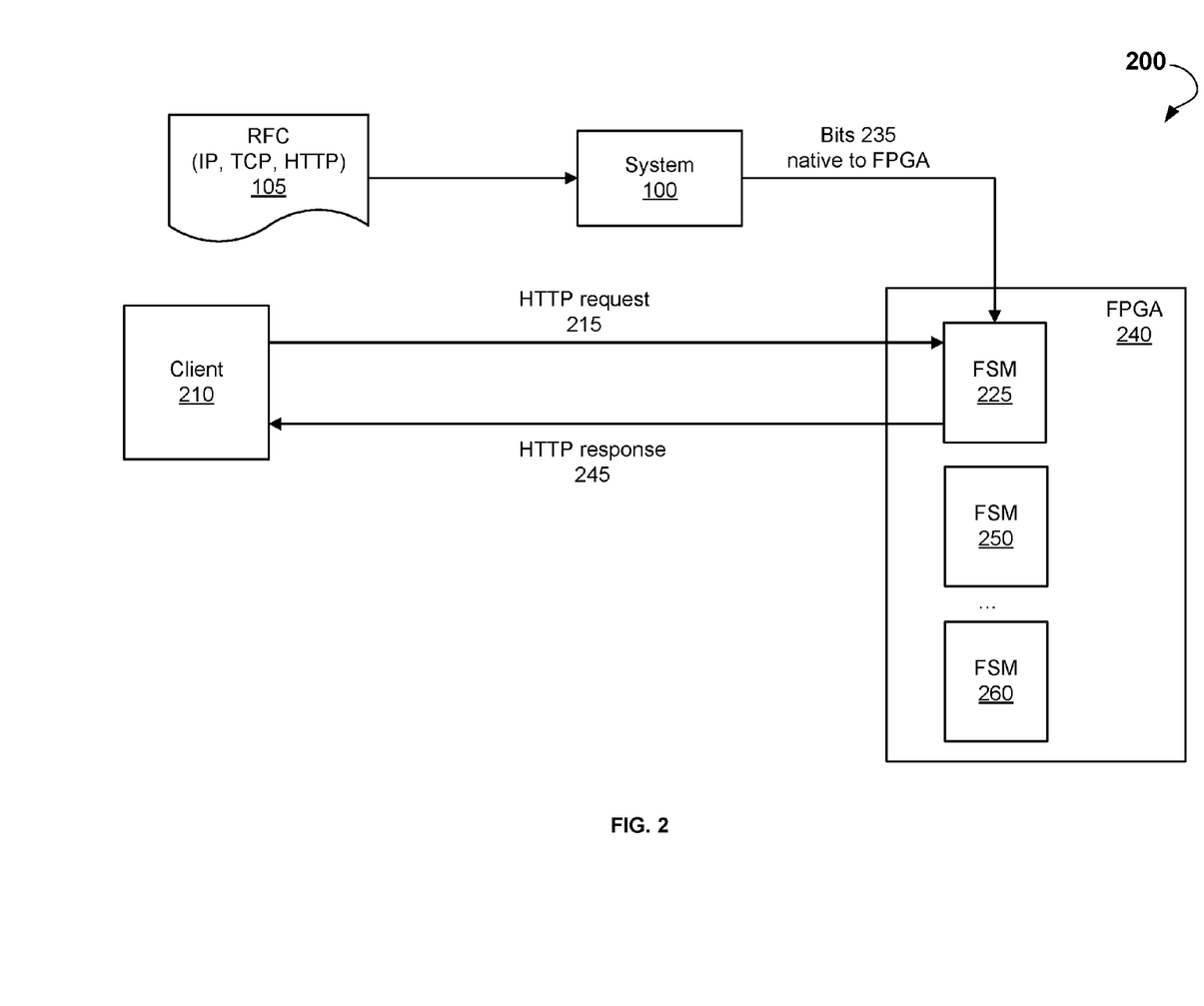
FIG. 2 is a block diagram showing an example system for processing of a Hypertext Transfer Protocol (HTTP) request, according to an example embodiment.

FIG. 2 is a block diagram showing an example system 200 for processing of HTTP requests, according to an example embodiment. The system 200 may include a client 210, the system 100 for compiling source codes, and a FPGA 240.

In certain embodiments, the system 100 may be configured to receive a RFC 105 for Internet protocol (IP), Transmission Control Protocol (TCP), and HTTP. The system 100 may be configured to program the RFC into a VHDL code, and, in turn, compile the VHDL code into bits 235 native to FPGA 240. The FPGA 240 may be programmed with bits 235. In an example illustrated by FIG. 2, the FPGA includes a finite state machine, FSM 225, corresponding to bits 235. In other embodiments, the bits 235 may be stored in a flash memory and the FPGA 235 may be configured to request bits 235 from the flash memory upon startup.

In some embodiments, the client 210 may be configured to send a HTTP request 215 to the FPGA 240. In some embodiments, the HTTP request 215 can be read by the FPGA 240. The FSM 225 may be configured to recognize the HTTP request 215 and return an HTTP response 245 corresponding to the HTTP request 215 back to the client 210. In certain embodiments, the FGPA 240 may include a fabric of FSM 250-260 to keep customers' application logics for recognizing different HTTP requests and providing different HTTP responses.

The system 200 may be an improvement over conventional HTTP servers, since the system 200 does not require large computing resources and maintenance of software for treatment of HTTP requests. The system FPGA 240 does not need to be physically large and requires a smaller amount of power than conventional HTTP servers.

Figure 3:
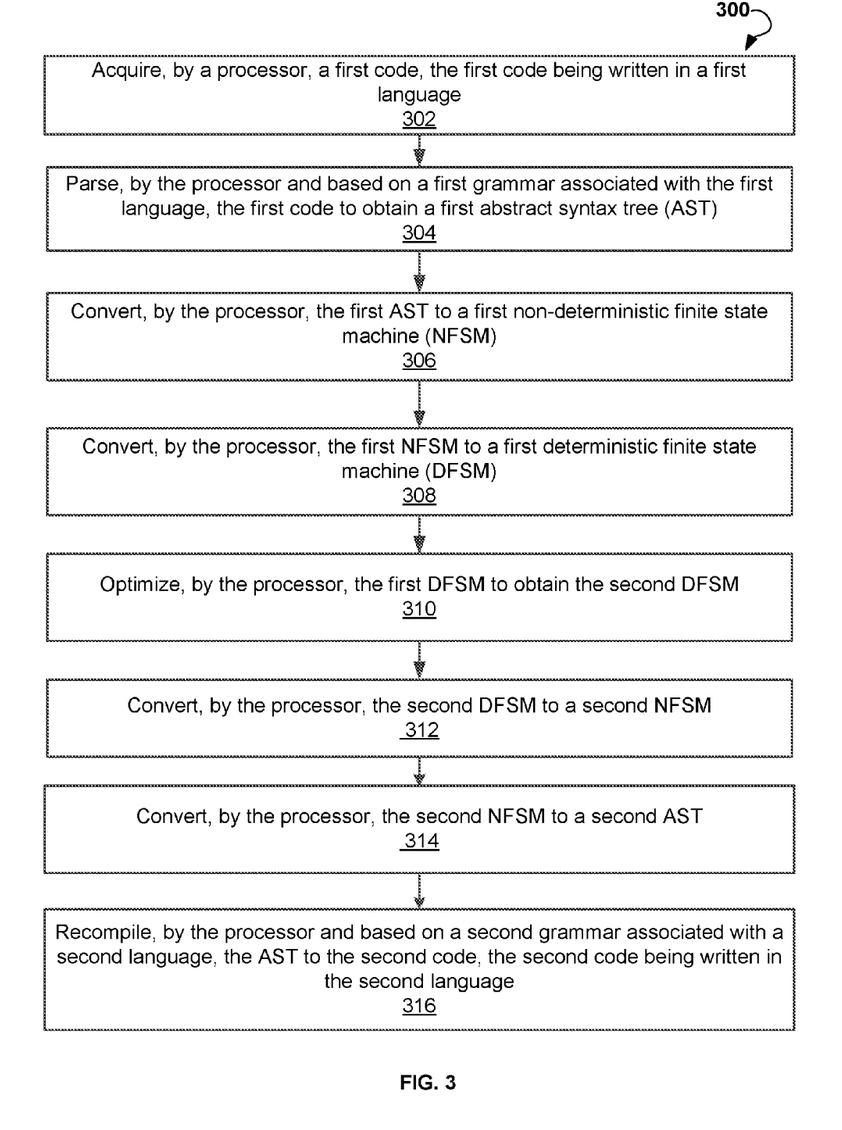
FIG. 3 is a process flow diagram showing a method for compiling source code, according to an example embodiment.

FIG. 3 is a process flow diagram showing a method 300 for compiling source codes, according to an example embodiment. The method 300 can be implemented with a computer system. An example computer system is described below with reference to FIG. 4.

The method 300 may commence, in block 302, with acquiring a first code, the first code being written in a first language. In block 304, method 300 may include parsing, based on a first grammar associated with the first language, the first code to obtain a first AST. In block 306, the method 300 may include converting the first AST to a NFSM. In block 308, the method 300 may include converting the first NFSM to a first DFSM. In block 310, the method 300 may include optimizing the first DFSM to obtain the second DFSM. In block 312, the method may include converting the second DFSM to a second NFSM. In block 314, the method 300 may include converting the second NFSM to a second AST. In block 316, the method 300 may include recompiling, based on a second grammar associated with a second language, the AST into the second code, the second code being written in the second language.

Figure 4:
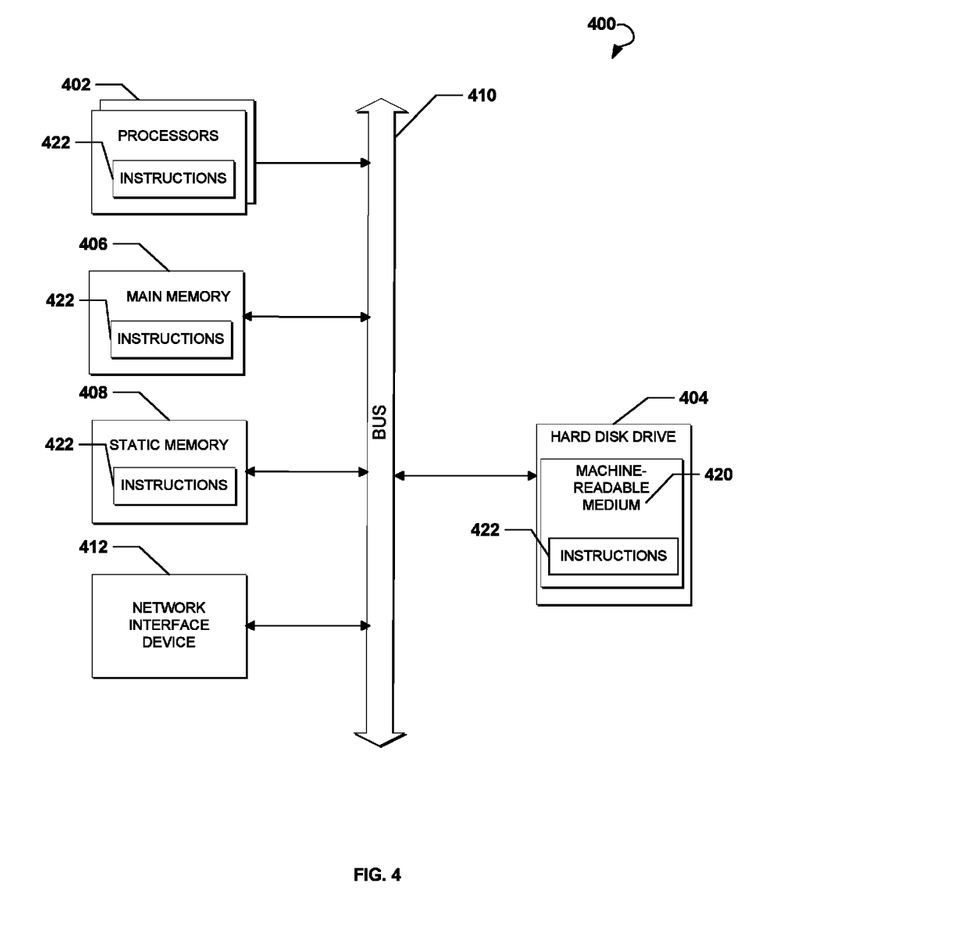
FIG. 4 shows a diagrammatic representation of a computing device for a machine in the example electronic form of a computer system, within which a set of instructions for causing the machine to perform any one or more of the methodologies discussed herein can be executed.

FIG. 4 shows a diagrammatic representation of a computing device for a machine in the exemplary electronic form of a computer system 400, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box (STB), a PDA, a cellular telephone, a digital camera, a portable music player (e.g., a portable hard drive audio device, such as a Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402, a hard disk drive 404, a main memory 406, and a static memory 408, which communicate with each other via a bus 410. The computer system 400 may also include a network interface device 412. The hard disk drive 404 may include a computer-readable medium 420, which stores one or more sets of instructions 422 embodying or utilized by any one or more of the methodologies or functions described herein. The instructions 422 can also reside, completely or at least partially, within the main memory 406 and/or within the processors 402 during execution thereof by the computer system 400. The main memory 406 and the processors 402 also constitute machine-readable media.

While the computer-readable medium 420 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, and optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, Python®, Javascript®, Go™, or other compilers, assemblers, interpreters or other computer languages or platforms.

Thus, systems and methods for compiling source code from programming languages to programming languages are disclosed. Although embodiments have been described with reference to specific example embodiments, it may be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for compiling and optimizing computer code and translating the computer source code from a first programming language into a second programming language, the method comprising:
   acquiring a first source code, the first source code being written in the first programming language;
   parsing, via one or more parsing expression grammar (PEG) modules and based on a first grammar associated with the first programming language determined by an augmented Backus-Naur Form (ABNF), the first source code to convert the first source code into a first abstract syntax tree (AST);
   converting the first AST into a first non-deterministic finite state machine (NFSM);
   converting the first NFSM into a first deterministic finite state machine (DFSM);
   optimizing the first DFSM by minimizing a number of states in a finite state machine and by twice reversing the edges of the first DFSM to produce a second NFSM using a standard powerset construction by constructing only the reachable states of the first DFSM to obtain an optimized DFSM; and
   converting, via at least the one or more PEG modules, the optimized DFSM into a second source code, the second source code being written in a second programming language wherein the second source code is a translation of the first source code; the converting the optimized DFSM including converting the optimized DFSM into a third NFSM, converting the third NFSM into a second AST, and recompiling the second AST into the second source code.

2. The method of claim 1, wherein the first programming language or the second programming language includes one of the following: JavaScript, C, C++, and a domain specific language.

3. The method of claim 1, wherein the first programming language or the second programming language includes one of the following: a hardware description language and bits native to a field-programmable gate array.

4. The method of claim 1, wherein the first programming language or the second programming language includes a presentation language.

5. The method of claim 1, further comprising prior to generating the second source code, performing, based on a formal specification, a formal verification of the optimized DFSM.

6. A system for compiling source code and translating the source code from a first programming language into a second programming language, the system comprising:
   at least one processor; and
   a memory communicatively coupled to the at least one processor, the memory storing instructions, which, when executed by the at least one processor, perform a method comprising:
      acquiring a first source code, the first source code being written in the first programming language;
      parsing, via one or more parsing expression grammar (PEG) modules and based on a first grammar associated with the first programming language determined by an augmented Backus-Naur Form (ABNF), the first source code to convert the first source code into a first abstract syntax tree (AST);
      converting the first AST into a first non-deterministic finite state machine (NFSM);
      converting the first NFSM into a first deterministic finite state machine (DFSM);
      optimizing the first DFSM by minimizing a number of states in a finite state machine and by twice reversing the edges of the first DFSM to produce a second NFSM using a standard powerset construction by constructing only the reachable states of the first DFSM to obtain an optimized DFSM; and
      converting, via at least the one or more PEG modules, the optimized DFSM into a second source code, the second source code being written in a second programming language wherein the second source code is a translation of the first source code, the converting the optimized DFSM including converting the optimized DFSM into a third NFSM, converting the third NFSM into a second AST, and recompiling the second AST into the second source code.

7. The system of claim 6, wherein the first programming language or the second programming language includes one of the following: JavaScript, C, C++, and a domain specific language.

8. The system of claim 6, wherein the first programming language or the second programming language includes one of the following: a hardware description language and bits native to a field-programmable gate array.

9. A non-transitory computer-readable storage medium having embodied thereon instructions, which, when executed by one or more processors, perform a method for translating source code from a first programming language into a second programming language, the method comprising:
   acquiring a first source code, the first source code being written in the first programming language;
   parsing, via one or more parsing expression grammar (PEG) modules and based on a first grammar associated with the first programming language, the first source code to convert the first source code into a first abstract syntax tree (AST), wherein the grammar is determined by an augmented Backus-Naur Form;
   converting the first AST into a first non-deterministic finite state machine (NFSM);

converting the first NFSM into a first deterministic finite state machine (DFSM);
optimizing the first DFSM by minimizing a number of states in a finite state machine and by twice reversing the edges of the first DFSM to produce a second NFSM using a standard powerset construction by constructing only the reachable states of the first DFSM to obtain an optimized DFSM;
converting the optimized DFSM into a third NFSM;
converting the third NFSM into a second AST; and
recompiling, via the one or more PEG modules and based on a second grammar associated with a second programming language, the second AST into the second source code, the second source code being written in the second programming language wherein the second source code is a translation of the first source code.

* * * * *